(12) United States Patent  
Jiang

(10) Patent No.: US 10,972,894 B2  
(45) Date of Patent: Apr. 6, 2021

(54) WIRELESS PAIRING SYSTEM AND METHOD THEREOF

(71) Applicant: SHENZHEN MINGZONG TECHNOLOGY CO., LTD., Guangdong (CN)

(72) Inventor: Zhizhou Jiang, Guangdong (CN)

(73) Assignee: SHENZHEN MINGZONG TECHNOLOGY CO., LTD., Guangdong (CN)

( * ) Notice: Subject to any disclaimer, the term of this patent is extended or adjusted under 35 U.S.C. 154(b) by 17 days.

(21) Appl. No.: 16/262,954

(22) Filed: Jan. 31, 2019

(65) Prior Publication Data

US 2019/0208397 A1  Jul. 4, 2019

Related U.S. Application Data

(63) Continuation of application No. PCT/CN2017/119712, filed on Dec. 29, 2017.

(51) Int. Cl.
| | |
|---|---|
| *H04W 4/00* | (2018.01) |
| *H04W 8/00* | (2009.01) |
| *H04W 76/14* | (2018.01) |
| *H04W 4/80* | (2018.01) |
| *H04W 76/11* | (2018.01) |

(52) U.S. Cl.
CPC .......... *H04W 8/005* (2013.01); *H04W 4/80* (2018.02); *H04W 76/11* (2018.02); *H04W 76/14* (2018.02)

(58) Field of Classification Search
CPC ....... H04W 4/80; H04W 76/11; H04W 76/14; H04W 8/005
See application file for complete search history.

(56) References Cited

U.S. PATENT DOCUMENTS

| | | | | |
|---|---|---|---|---|
| 2013/0095753 | A1* | 4/2013 | Chen | H04W 12/04 455/41.1 |
| 2016/0260319 | A1* | 9/2016 | Jeffery | G08C 17/02 |
| 2016/0360350 | A1* | 12/2016 | Watson | H04W 12/04 |
| 2017/0078454 | A1 | 3/2017 | Berookhim et al. | |
| 2018/0020495 | A1* | 1/2018 | Nakayama | G03G 15/0893 |

FOREIGN PATENT DOCUMENTS

| | | |
|---|---|---|
| CN | 103228060 | 7/2013 |
| CN | 106102129 | 11/2016 |
| CN | 106851530 | 6/2017 |

\* cited by examiner

*Primary Examiner* — Minh Trang T Nguyen  
(74) *Attorney, Agent, or Firm* — JCIPRNET

(57) ABSTRACT

A wireless pairing system includes an emitting terminal and a receiving terminal, the emitting terminal includes an emitting terminal storage unit, a traversal unit, a pairing unit and an emitting terminal wireless transceiver. The receiving terminal includes a receiving terminal storage unit, a detecting unit, a coupling receiver and a receiving terminal wireless transceiver. The emitting terminal transmits matching requests in priority to receiving terminals having been paired in history record. The receiving terminal in priority gets the matching request sent by the emitting terminal having been paired with at last time, thereby pairing cycles can be effectively shortened, and pairing efficiency of the mitting terminal and the receiving terminal can be effectively improved.

16 Claims, 3 Drawing Sheets

WIRELESS PAIRING SYSTEM AND METHOD THEREOF

CROSS-REFERENCE TO RELATED APPLICATION

This application is a continuation of international PCT application serial no PCT/CN2017/119712, with an international filing date of Dec. 29, 2017. The entirety of the above-mentioned patent application is hereby incorporated by reference herein and made a part of this specification.

BACKGROUND OF THE INVENTION

1. Field of the Invention

The present disclosure relates to wireless communication, and more particularly, to a wireless pairing system and wireless pairing method.

2. Description of Related Art

In wireless communication application environments between an emitting terminal and a receiving terminal, it is required that an antecedent pairing process between the emitting terminal and the receiving terminal should be carried out, and then a subsequent communication can be executed. In a conventional manual pairing condition, identification codes of the opposite party should be respectively inputted by the emitting terminal or the receiving terminal, or pairing buttons should be activated respectively, thereby a pairing process being carried out.

Due to far distance between the emitting terminal and the receiving terminal, it is impossible for an individual to simultaneously operate the emitting terminal and the receiving terminal. Therefore, a wireless pairing system is provided, to make the emitting terminal and the receiving terminal automatically carry out a pairing process; or to accomplish the pairing process of the emitting terminal and the receiving terminal by single ended controlling.

CONTENTS OF THE DISCLOSURE

To solve the aforementioned technical problem, objectives of embodiments of the present disclosure are to provide a wireless pairing system.

The wireless pairing system includes an emitting terminal and a receiving terminal.

Wherein, the emitting terminal includes an emitting terminal storage unit, a traversal unit, a pairing unit and an emitting terminal wireless transceiver, the emitting terminal storage unit is adapted to store an identifier list of receiving terminals having been connected with the emitting terminal ever, the traversal unit is adapted to send matching requests successively to the receiving terminals in the identifier list of receiving terminals, until the emitting terminal wireless transceiver receives a matching response, the pairing unit is adapted to transmit coupling requests to detectable receiving terminals on condition that the emitting terminal wireless transceiver receives no matching response returned by the receiving terminal within a first preset time, and the emitting terminal wireless transceiver is adapted to detect receipts of matching responses or coupling responses, on condition of receipts of a matching response or a coupling response, to select the receiving terminal corresponding to received matching response or received coupling response as a target receiving terminal, and to set up a communication connection with the target receiving terminal;

the receiving terminal includes:

a receiving terminal storage unit, is adapted to store an emitting terminal identifier of an emitting terminal last paired with the receiving terminal, a detecting unit, is adapted to detect a receipt of a matching request from the emitting terminal last paired with the receiving terminal;

a coupling receiver, is adapted to detect a receipt of a coupling request, on condition that the detecting unit receives no matching request from the emitting terminal last paired with the receiving terminal; and a receiving terminal wireless transceiver, is adapted to determine the emitting terminal corresponding to matching request received or received coupling request as a target emitting terminal, on condition that the detecting unit receives the matching request or the coupling receiver receives the coupling request, and to build a communication connection with the target emitting terminal.

In one embodiment of the present invention, the traversal unit is further adapted to sort receiving terminal identifiers in the identifier list of receiving terminals, according to time tab corresponding to each receiving terminal identifier. The time tab is a history pairing time between the receiving terminal and the emitting terminal in accordance with relating receiving terminal identifier, and the sorting is carried out on the basis of interval values between a history pairing time and a current time in smallest to largest order.

In one embodiment of the present invention, the receiving terminal further comprises a triggering unit, when the triggering unit is activated, the coupling receiver executes the step of detecting a receipt of a coupling request.

In one embodiment of the present invention, the pairing unit is further adapted to send coupling requests in a second preset time to detectable receiving terminals, and to cease sending coupling requests to detectable receiving terminals in condition of no coupling response received by the emitting terminal wireless transceiver.

In one embodiment of the present invention, the traversal unit is further adapted to transmit matching requests successively to receiving terminals in the identifier list of receiving terminals, when a third preset time is up after the pairing unit ceases sending coupling requests to the detectable receiving terminal, until the emitting terminal wireless transceiver gets a matching response.

In one embodiment of the present invention, the emitting terminal is engaged with a first device, the receiving terminal is engaged with a second device comprising a power supply. On condition that an electrical connection is set between the second device and the first device, the second device is adapted to transmit electricity of the power supply to the emitting terminal by the electrical connection thereby the emitting terminal is powered.

In one embodiment of the present invention, the first device is a detachable locomotive, the second device is a detachable container connected with the detachable locomotive, the receiving terminal is a display device engaged with the detachable locomotive, and the emitting terminal is a camera equipment disposed on the detachable container.

In another aspect of the present invention, a launching method of wireless pairing is disclosed, the method comprises:

transmitting matching requests successively to receiving terminals in a identifier list of receiving terminals, until an emitting terminal wireless transceiver receives a matching response;

transmitting coupling requests to detectable receiving terminals, on condition of no matching response from the receiving terminals received by the emitting terminal wireless transceiver within a first preset time;

detecting receipts of the matching response or a coupling response, on condition of a receipt of the matching response or the coupling response, determining the receiving terminal getting the matching response or the coupling response as a target receiving terminal, and set up a communication connection with the target receiving terminal.

In one embodiment of the present invention, the step of transmitting matching requests successively to receiving terminals in an identifier list of receiving terminals comprises:

sorting receiving terminal identifiers in the identifier list of receiving terminals, according to time tab corresponding to each receiving terminal identifier. The time tab is a history pairing time between the receiving terminal and the emitting terminal in accordance with relating receiving terminal identifier, and the sorting is carried out on the basis of interval values between a history pairing time and a current time in smallest to largest order.

In one embodiment of the present invention, the step of transmitting coupling requests to detectable receiving terminals comprises:

ceasing pairing process, within a second preset time for transmitting coupling requests successively to detectable receiving terminals, without receipt of the coupling response; or suspending pairing process, and after a third preset time, transmitting coupling requests successively to receiving terminals in the identifier list of receiving terminals, until a coupling response is received.

In another aspect of the present invention, a wireless pairing method of receiving terminal is provided, the method comprises the following steps:

detecting a receipt of a matching request sent by an emitting terminal, last paired with a receiving terminal;

detecting a receipt of a coupling request, on condition that a detecting unit receives no matching request from the emitting terminal last paired with the receiving terminal;

determining the emitting terminal corresponding to matching request received or received coupling request as a target emitting terminal, on condition that the detecting unit receives the matching request or the coupling receiver receives the coupling request, and building a communication connection with the target emitting terminal.

Effective Results

Effective results of the embodiment of the present disclosure are listed below:

The emitting terminal sends matching requests in priority to receiving terminals having been paired in history record, and the receiving terminal in priority gets a matching request sent by an emitting terminal having been recently paired with. Thereby a pairing cycle can be effectively shortened and pairing efficiency of the mitting terminal and the receiving terminal can be effectively improved.

DETAILED DESCRIPTION OF THE DISCLOSURE

To make the objective, technical solutions and advantages of the present disclosure clearer, the present disclosure will be further detailed with reference to specific embodiments thereof and the attached drawings. It is understood that the embodiments of the present invention are elaborated to construe the present invention, and not to limit technical solutions of this application.

Figure 1:
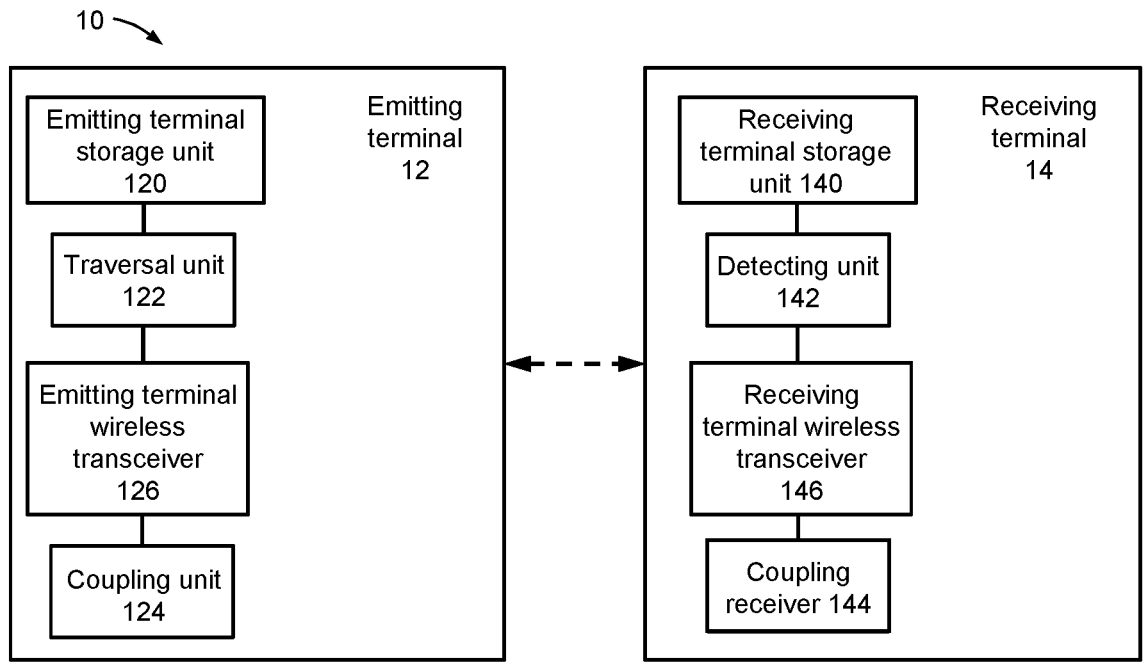
FIG. 1 is a schematic view of a wireless pairing system in one embodiment of the present disclosure.

Referring to FIG. 1, according to one embodiment of the present disclosure, a wireless pairing system 100 is provided, the system 10 includes an emitting terminal 12 and a receiving terminal 14. In realistic practice, more than one emitting terminal 12 and more than one receiving terminal 14 can be adopted, therefore, for a specific emitting terminal/receiving terminal. A preceding pairing process should be carried out between the specific emitting terminal/receiving terminal and an available receiving terminal/emitting terminal. Only after the preceding pairing process, can the emitting terminal communicate with the receiving terminal.

It should be noted that the terms in present disclosure "emitting terminal" and "receiving terminal" are not restricted only referring to a terminal of transmitting or a terminal of taking over. The emitting terminal can accept communicating signals at some stage, the communicating signals include but not limited to feedback signals sent by a receiving terminal. The receiving terminal can send communicating signals at some stage, the communicating signals include but not limited to feedback signals and so on from a receiving terminal indicating to the emitting terminal a refusal or an acceptance.

Referring to FIG. 1, the emitting terminal 12 includes an emitting terminal storage unit 120, a traversal unit 122, a pairing unit 124, and an emitting terminal wireless transceiver 126.

Wherein, the emitting terminal storage unit 120 is used for storing an identifier list of receiving terminals with information of receiving terminals 14 having been paired with emitting terminals 12 in history record. In real practice, the emitting terminal 12 and the receiving terminal 14 are usually arranged in a set matching. In a nonrestrictive embodiment, the emitting terminal can be a wireless speaker, and the receiving terminal can be a smartphone, notebook, palmtop, etc. In general, according to customer habits, the wireless speaker normally set up a communication connection by blue tooth module of a smartphone. Therefore, it is preferred that an identifier list of receiving terminals is stored in the wireless speaker, for recording a list of receiving terminals having been paired with the wireless speaker in history record.

The traversal unit 122 is adapted to send matching requests to the receiving terminals 14 in the identifier list of receiving terminals successively, until the emitting terminal wireless transceiver 126 receives a matching response.

Preferably, the traversal unit 122 is further adapted to sort receiving terminal identifiers in the identifier list of receiving terminals, according to time tab corresponding to each receiving terminal identifier. The time tab is a history pairing time between the receiving terminal and the emitting terminal in accordance with relating receiving terminal identifier, and the sorting is carried out on the basis of interval values between a history pairing time and a current time in smallest to largest order. It should be noted that if an emitting terminal 12 has been paired with a receiving terminal 14 for many time in history, the receiving terminal 14 is only recorded once in the identifier list of receiving terminals. Time tab corresponding to the receiving terminal is the history pairing time when the receiving terminal is paired with the emitting terminal at last time. Regarding the embodiment with the above described wireless speaker, receiving devices having been paired ever are recorded in the wireless speaker, such as smartphone, laptop, palmtop and so forth, and only the last history pairing record are stored.

It is further noted that although the traversal unit 122 sorts the identifier list of receiving terminals in the above illustration. In another embodiment, the identifier list of receiving terminals is sorted according to recent history pairing time between the receiving terminals in the list and a specific receiving terminal. The traversal unit 122 sends matching requests in accordance with chronological order of history paring time to the receiving terminals in the identifier list of receiving terminals in last pairing process.

The pairing unit 124 is adapted to transmit coupling requests to detectable receiving terminals on condition that the emitting terminal wireless transceiver 126 receives no matching response returned by the receiving terminal within a first preset time. In detail, it would be described that when the emitting terminal 12 send out a matching request, and after the receiving terminal 14 takes over the matching request, the receiving terminal 14 would return a matching response to the emitting terminal wireless transceiver 126 of the emitting terminal 12 which sends out the matching request. Therefore, a preset duration is needed, for example, 6 seconds, in the preset duration, (from the moment the traversal unit 122 starts to send matching request). If no matching response received, it means that all of receiving terminals in the identifier list of receiving terminals receives or accept no matching request. At this moment, the emitting terminal 12 initiates a generic pairing mode, i.e., the pairing unit 124 sends out coupling requests to all detectable receiving terminals 14, until a coupling response is received.

It is noted that the preset duration is determined based on length of identifier list of receiving terminals and processing speed of the system 10, as long as the emitting terminal 12 can send out matching requests to all receiving terminals in the identifier list of receiving terminals within the preset duration.

In another embodiment, in the generic pairing mode, the pairing unit 124 successively sends out coupling requests to detectable receiving terminals. It is preferred that in each pairing process, after a preset time the pairing unit 124 send out a coupling request to a receiving terminal 14 available for connection, it is need that the emitting terminal wireless transceiver 126 is detected a receipt of a matching response; if no matching response received, go on generic pairing.

The emitting terminal wireless transceiver 126 is adapted to detect receipts of matching responses or coupling responses, on condition of receipts of a matching response or a coupling response, to determine the receiving terminal 14 corresponding to received matching response or received coupling response as a target receiving terminal, and to set up a communication connection with the target receiving terminal.

In a preferred embodiment, the pairing unit 124 is further adapted to send coupling requests in a second preset time to detectable receiving terminals, and to cease sending coupling requests to detectable receiving terminals in condition of no coupling response received by the emitting terminal wireless transceiver 126.

In detail, it is presumed that the second preset time is 60 seconds, it means that the system 10 will assign 60 seconds to the pairing unit 124 to send coupling requests, if the emitting terminal wireless transceiver 126 receives no coupling response within the 60 seconds. It is inferred that no receiving terminal 14 receives or accepts the coupling requests, and the coupling request process is failed. For energy source saving purpose, stop emitting coupling requests.

It is further preferred that the traversal unit 122 is further adapted to transmit matching requests successively to receiving terminals 14 in the identifier list of receiving terminals again, when a third preset time is up after the pairing unit 124 ceases sending coupling requests to the detectable receiving terminal, until the emitting terminal wireless transceiver 126 gets a matching response.

In details, it is presumed that the third preset time is 3 minutes, and it means that the system 10 will continue to send out matching requests when the 3 minutes is up after stopping emitting coupling requests. Moreover, the receiving terminals 14 to be sent matching requests are restricted to be selected from the receiving terminal 14 listed in the identifier list of receiving terminals.

The receiving terminal 14 includes:
a receiving terminal storage unit 140, is adapted to store an emitting terminal identifier of an emitting terminal last paired with the receiving terminal;
a detecting unit 142, is adapted to detect a receipt of a matching request from the emitting terminal 12 last paired with the receiving terminal 14;
a coupling receiver 144, is adapted to detect a receipt of a coupling request, on condition that the detecting unit 142 receives no matching request from the emitting terminal last paired with the receiving terminal; and
a receiving terminal wireless transceiver 146, is adapted to determine the emitting terminal 12 corresponding to received matching request or received coupling request as a target emitting terminal, on condition that the detecting unit 142 receives the matching request or the coupling receiver 144 receives the coupling request. And the receiving terminal wireless transceiver 146 is adapted to build a communication connection with the target emitting terminal.

In details, take a smartphone as an example of receiving terminal 14. To be a receiving terminal 14, the smartphone has been paired with a wireless camera, a wireless earphone, and a wireless speaker by coupling request means, and the smartphone only stores one emitting terminal 12 having successfully paired with the smartphone in most recently pairing process, for example, the last paired emitting terminal 12 in history is the wireless earphone, the detecting unit 142 of the smartphone will first detect a receipt of a matching request from the wireless earphone. Because, in real practice, the receiving terminal 14 prefers to continue to pair with the emitting terminal 12 having been successfully connected in previous time. For example, in a communication course between the smartphone and the wireless earphone, except for an artificial breaking down of the communication connection, message signals interrupts, power down, and so forth are the most common causes resulting in communication breaking down. Under such circumstances, the receiving terminal 14, i.e., the smartphone still needs to pair again with the emitting terminal 12, i.e., the wireless earphone successfully paired in previous time after being powered on again or signal recovery, so as to continue previous communicating procedure.

If the receiving terminal 14, such as a smartphone, fails to get the matching request from the emitting terminal 12 successfully paired in previous time, that is the wireless earphone, the receiving terminal 14 will activate the generic pairing mode of the receiving terminal. That is utilizing the coupling receiver 144 to check a receipt of a coupling request. It is preferred that the checking procedure will be paused when a coupling request is detected by the coupling receiver 144.

Figure 2:
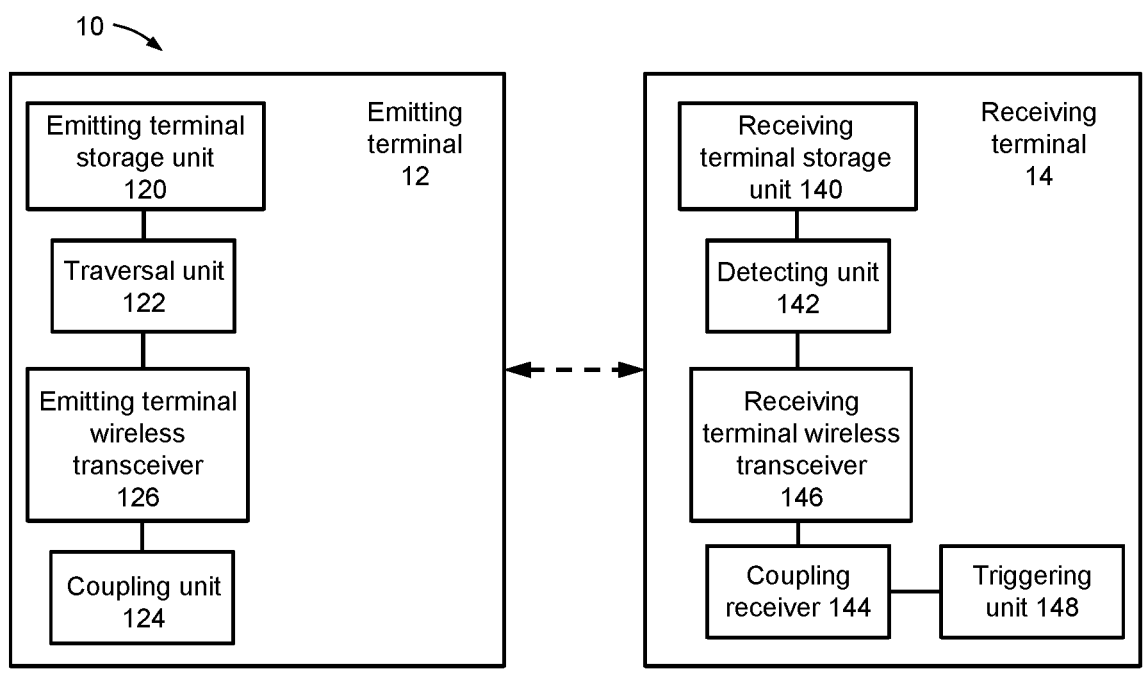
FIG. 2 is a schematic view of a wireless pairing system in another embodiment of the present disclosure.

As shown in FIG. 2, in a preferred embodiment, the receiving terminal 14 further includes a triggering unit 148. When the triggering unit 148 is activated, the coupling receiver 144 executes the step of detecting a receipt of a coupling request.

In present embodiment, the coupling receiver 144 no longer diagnoses whether the detecting unit 142 would receive a coupling request send by the emitting terminal 12 last paired with the receiving terminal 14 or no, and only the triggering unit 148 is activated, the following step is executed: detecting a receipt of a coupling request.

The differences between the embodiment in FIG. 2 and the embodiment in FIG. 1 are described below: in the embodiment of FIG. 1, as long as no matching request is received, sent out by the emitting terminal 12 last paired with the receiving terminal 14, the generic pairing mode will be activated to detect a receipt of coupling request. In the embodiment in FIG. 2, the triggering unit 148 needs to be artificially triggered to activate the generic pairing mode of receiving terminal. The effective results of the embodiment in FIG. 2 lies in: the receiving terminal 14 can not only continue to pair the emitting terminal 12 successfully connected in previous time in priority, but also be capable of initiatively choosing whether to accept coupling requests from all detectable receiving terminal 14 after pairing failure.

In another embodiment, the emitting terminal 12 is engaged with a first device, the receiving terminal 14 is engaged with a second device including a power supply. On condition that an electrical connection is set between the second device and the first device, the second device is adapted to transmit electricity of the power supply to the emitting terminal by the electrical connection, thereby the emitting terminal is powered.

Combined with the above illustration, if the emitting terminal 12 is independently powered, the emitting terminal will continuously send out matching requests or coupling requests unless the emitting terminal 12 successfully connected with the receiving terminal 14, or when a third preset time is up after interruptions, the emitting terminal will repeat a cycle of sending matching requests. Thus, second device engaged with the receiving terminal 104 provides power supply to the first device engaged with the emitting terminal 102 can efficiently conserve energy of the system 10, as elaborated in the detailed embodiment below.

Detailed Embodiment

In present detailed embodiment, the first device can be a detachable locomotive, the second device can be a detachable container engaged with the detachable locomotive. The receiving terminal 14 can be a display device disposed on the detachable locomotive, and the emitting terminal 12 can be a camera equipment mounted onto the detachable container.

The camera equipment includes an emitting terminal storage unit 120, a traversal unit 122, a pairing unit 124, and an emitting terminal wireless transceiver 126.

Wherein, the emitting terminal storage unit 120 is adapted to store an identifier list of receiving terminals of display devices having been paired with the camera equipment in history.

The traversal unit 122 is adapted to transmit matching requests successively to the display devices in the identifier list of receiving terminals, until the emitting terminal wireless transceiver 126 receives a matching response.

It is preferred that the traversal unit 122 is further adapted to sort receiving terminal identifiers in the identifier list of receiving terminals, according to time tab corresponding to each receiving terminal identifier. The time tab is a history pairing time between the receiving terminal and the emitting terminal in accordance with relating receiving terminal identifier, and the sorting is carried out on the basis of interval values between a history pairing time and a current time in smallest to largest order. It should be noted that if a camera equipment has paired with a display device for many times in history, and only one connection record of the display device is logged in the identifier list of receiving terminals. The time tab of the display device is the history pairing time when the display device is paired with the camera equipment at last time.

It should be clarified, although described above, the traversal unit 122 sorts the identifier list of receiving terminals. In an alternative embodiment, the identifier list of receiving terminals is sorted according to recent history pairing time between the display devices in the list and a specific camera equipment. The traversal unit 122 sends matching requests in accordance with chronological order of recent history paring time to the receiving terminals in the identifier list of receiving terminals.

The pairing unit 124 is adapted to transmit coupling requests to detectable receiving terminals on condition that the emitting terminal wireless transceiver 126 receives no matching response returned by the receiving terminal within a first preset time. In details, mentioned below, when the camera equipment sends out a matching request, after the display device takes over the matching request, the display device will transmit a matching response to an emitting terminal wireless transceiver 126 of the camera equipment sending out the matching request. Therefore, a preset duration is needed, such as 6 seconds, within the time of the preset duration, (from the moment the traversal unit 122 starts to send matching request). If no matching response received, it means that all of receiving terminals in the identifier list of receiving terminals receives or accept no matching request. At this moment, the camera equipment initiates the generic pairing mode, i.e., the pairing unit 124 sends out coupling requests to all detectable display device, until a coupling response is received.

It should be noted that the preset duration is determined based on length of identifier list of receiving terminals and processing speed of the system 10, as long as the camera equipment can send out matching requests to all receiving terminals in the identifier list of receiving terminals within the preset duration.

In another embodiment, in the generic pairing mode, the pairing unit 124 successively sends out coupling requests to detectable receiving terminals. It is preferred that in each pairing process, after a preset time the pairing unit 124 send out a coupling request to a display device available for connection, it is need that the emitting terminal wireless transceiver 126 is detected a receipt of a matching response by the pairing unit 124; if no matching response received, go on generic pairing.

The emitting terminal wireless transceiver 126 is adapted to detect receipts of matching responses or coupling responses, on condition of receipts of a matching response or a coupling response, to determine the display device corresponding to received matching response or received coupling response as a target receiving terminal, and to set up a communication connection with the target receiving terminal.

In a preferred embodiment, the pairing unit 124 is further adapted to send coupling requests in a second preset time to detectable receiving terminals, and to cease sending coupling requests to detectable receiving terminals in condition of no coupling response received by the emitting terminal wireless transceiver 126.

In details, for example, the second preset time is 60 seconds, it means that the system 10 will assign 60 seconds to the pairing unit 124 to send coupling requests, if the emitting terminal wireless transceiver 126 receives no coupling response within the 60 seconds. It is inferred that no display device receives or accepts the coupling requests, and the coupling request process is failed. For energy source saving purpose, stop emitting coupling requests.

In a further preferred embodiment, the traversal unit 122 is further adapted to successively transmit matching requests to display devices in the identifier list of receiving terminals, when a third preset time is up after the pairing unit 124 ceases sending coupling requests to the detectable receiving terminal, until the emitting terminal wireless transceiver 126 gets a matching response.

In detail, it is presumed that the third preset time is 3 minutes, and it means that the system 10 will continue to send out matching requests when the 3 minutes is up after stopping emitting coupling requests. Moreover, the receiving terminals 14 to be sent matching requests are restricted to be selected from the display devices listed in the identifier list of receiving terminals.

The display device includes:

a receiving terminal storage unit 140, is adapted to store an emitting terminal identifier of a camera equipment last paired with the display device;

a detecting unit 142, is adapted to detect a receipt of a matching request from the camera equipment last paired with the display device;

a coupling receiver 144, is adapted to detect a receipt of a coupling request, on condition that the detecting unit 142 receives no matching request from the emitting terminal last paired with the receiving terminal; and a receiving terminal wireless transceiver 146, is adapted to determine the camera equipment corresponding to received matching request or received coupling request as a target emitting terminal, on condition that the detecting unit 142 receives the matching request or the coupling receiver 144 receives the coupling request, and to build a communication connection with the target emitting terminal.

In a preferred embodiment, the display device further includes a triggering unit 148. When the triggering unit 148 is activated, the coupling receiver 144 executes the step of detecting a receipt of a coupling request.

In present embodiment, the coupling receiver 144 no longer diagnoses whether the detecting unit 142 would receive a matching request send by the camera equipment last paired with the display device or no, and only the triggering unit 148 is activated, the following step is executed: detecting a receipt of a coupling request.

Figure 3:
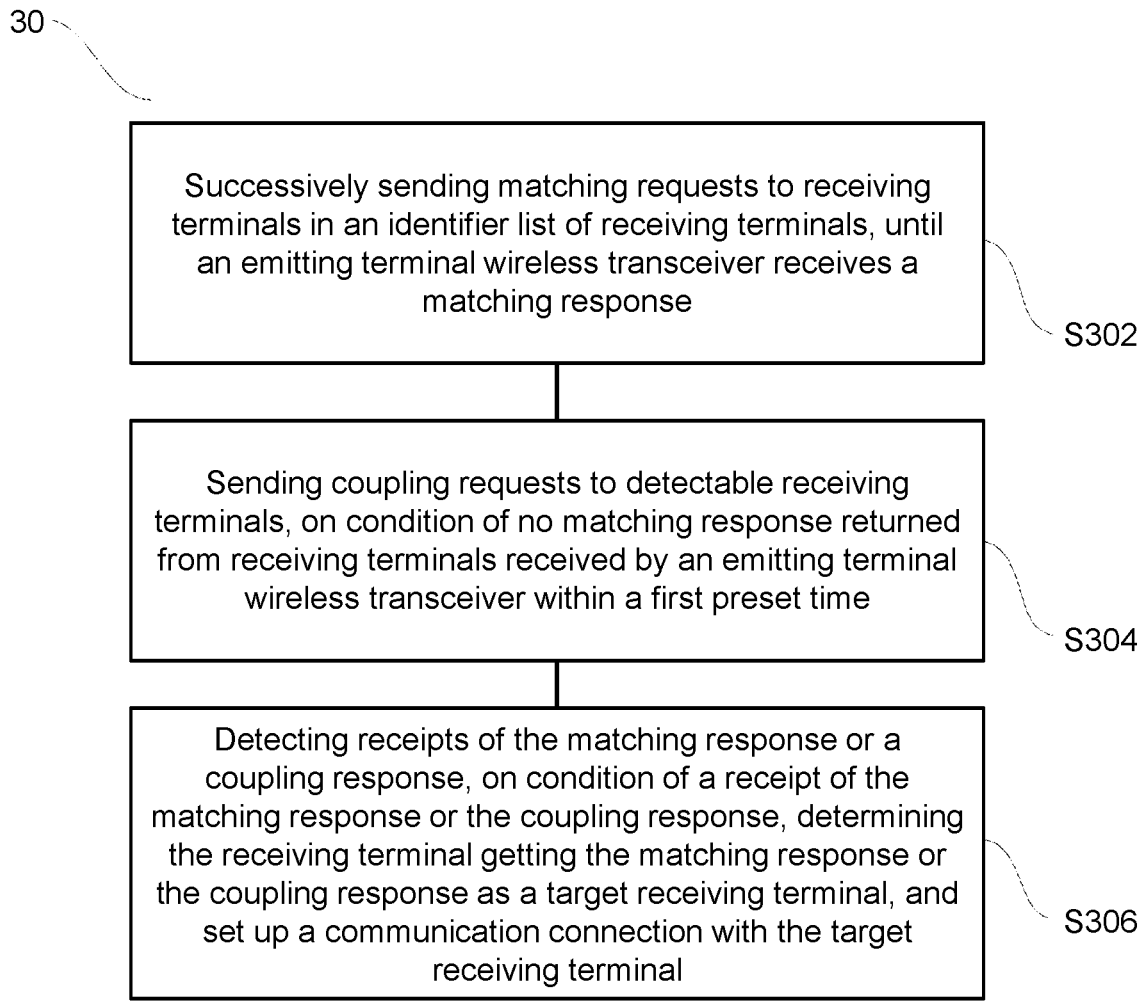
FIG. 3 is a flow chart of a launching method of wireless pairing in another embodiment of the present disclosure.

According to another aspect of the present disclosure, as referring to FIG. 3, a launching method of wireless pairing 30 is provided. The method is engaged with an emitting terminal of a wireless communication system having emitting terminals and receiving terminals.

The method includes:

S302, successively sending matching requests to receiving terminals in an identifier list of receiving terminals, until an emitting terminal wireless transceiver receives a matching response;

S304, sending coupling requests to detectable receiving terminals, on condition of no matching response returned from receiving terminals received by an emitting terminal wireless transceiver within a first preset time; and S306, detecting receipts of the matching response or a coupling response, on condition of a receipt of the matching response or the coupling response, determining the receiving terminal getting the matching response or the coupling response as a target receiving terminal, and set up a communication connection with the target receiving terminal.

In one embodiment, step S302 includes: sorting receiving terminal identifiers in the identifier list of receiving terminals, according to time tab corresponding to each receiving terminal identifier. The time tab is a history pairing time between the receiving terminal and the emitting terminal in accordance with relating receiving terminal identifier, and the sorting is carried out on the basis of interval values between a history pairing time and a current time in smallest to largest order.

In one embodiment, step S304 includes:

ceasing pairing process, within a second preset time for successively transmitting coupling requests to detectable receiving terminals, without receipt of the coupling response; or suspending pairing process, and after a third preset time, successively transmitting coupling requests to receiving terminals in the identifier list of receiving terminals, until a coupling response is received.

Figure 4:
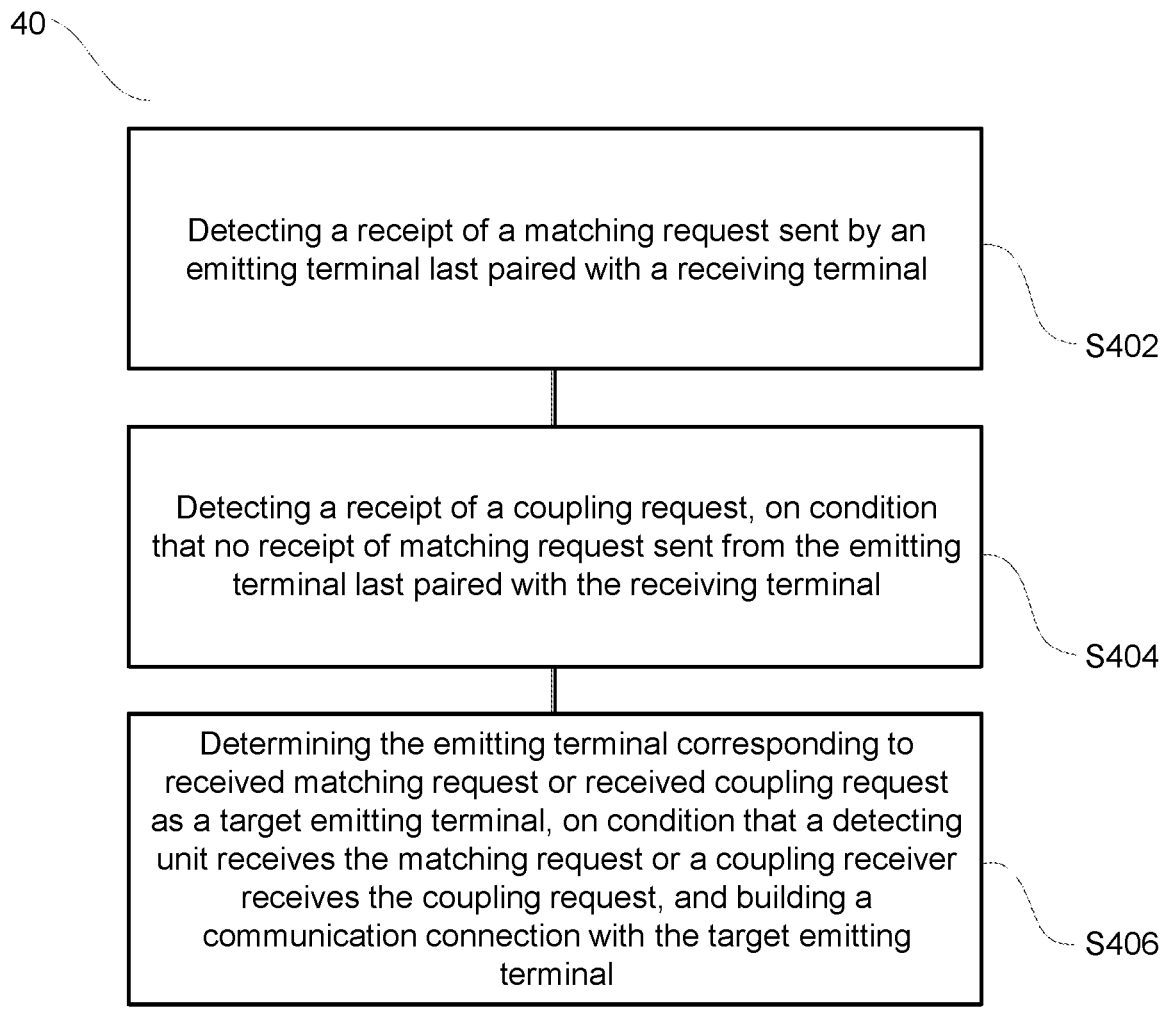
FIG. 4 is a flow chart of a wireless pairing method of receiving terminal in another embodiment of the present disclosure.

According to another aspect of the present disclosure, as referring to FIG. 4, a receiving terminal wireless pairing method 40 is provided. The receiving terminal wireless pairing method 40 are applied in a receiving terminal of a wireless communication system having emitting terminals and receiving terminals, including steps of below:

S402, detecting a receipt of a matching request sent by an emitting terminal last paired with a receiving terminal;

S404, detecting a receipt of a coupling request, on condition that no receipt of matching request sent from the emitting terminal last paired with the receiving terminal; and S406, determining the emitting terminal corresponding to received matching request or received coupling request as a target emitting terminal, on condition that a detecting unit receives the matching request or a coupling receiver receives the coupling request, and building a communication connection with the target emitting terminal.

What described above are embodiments of the present disclosure, and are not intended to limit embodiments the present technical disclosure. The embodiments described above are only schematic without restrictions. It should be noted that any modifications, equivalent replacements, and alterations made by those of ordinary skill in the art within the spirits and principles of the present technical disclosure shall be included in the scope of the present disclosure. In addition, some specific terms are applied in the present disclosure, for contributing to illustration of the present technical disclosure, which serves no grounds to any restriction.

What is claimed is:

1. A wireless pairing system comprising an emitting terminal and a receiving terminal,
wherein the emitting terminal comprises an emitting terminal storage unit, a traversal unit, a pairing unit and an emitting terminal wireless transceiver,
the emitting terminal storage unit is adapted to store an identifier list of the receiving terminals previously connected with the emitting terminal,
the traversal unit is adapted to send matching requests successively to the receiving terminals in the identifier list of the receiving terminals, until the emitting terminal wireless transceiver receives a matching response,
the pairing unit is adapted to transmit coupling requests to detectable receiving terminals on condition that the emitting terminal wireless transceiver receives no matching response returned by the receiving terminals in the identifier list of the receiving terminals within a first preset time,
the emitting terminal wireless transceiver is adapted to detect receiving the matching response or the coupling response, on condition of receiving the matching response or the coupling response, to determine the receiving terminal corresponding to the received matching response or the received coupling response as a target receiving terminal, and to set up a communication connection with the target receiving terminal;
wherein the receiving terminal comprises:
a receiving terminal storage unit, adapted to store an emitting terminal identifier of an emitting terminal last paired with the receiving terminal,
a detecting unit, adapted to detect receiving a matching request from the emitting terminal last paired with the receiving terminal;
a coupling receiver, adapted to detect receiving a coupling request, on condition that the detecting unit receives no matching request from the emitting terminal last paired with the receiving terminal; and
a receiving terminal wireless transceiver, adapted to determine the emitting terminal corresponding to received matching request or received coupling request as a target emitting terminal, on condition that the detecting unit receives the matching request or the coupling receiver receives the coupling request, and to build a communication connection with the target emitting terminal.

2. The wireless pairing system of claim 1, wherein the traversal unit is further adapted to sort receiving terminal identifiers in the identifier list of the receiving terminals, according to a time tab corresponding to each of the receiving terminal identifier, wherein the time tab is a history pairing time between the receiving terminal and the emitting terminal in accordance with the relating receiving terminal identifier, and the receiving terminal identifiers are sorted based on a time interval between a history pairing time and a current time in an order from small to large.

3. A launching method of wireless pairing based on an emitting terminal of a wireless pairing system in claim 2, the method comprising the following steps:
transmitting matching requests successively to the receiving terminals in an identifier list of the receiving terminals, until an emitting terminal wireless transceiver receives a matching response;
transmitting coupling requests to detectable receiving terminals, on condition of no matching response from the receiving terminals received by the emitting terminal wireless transceiver within a first preset time;
detecting receiving the matching response or a coupling response, on condition of receiving the matching response or the coupling response, determining the receiving terminal getting the matching response or the coupling response as a target receiving terminal, and setting up a communication connection with the target receiving terminal.

4. The wireless pairing system of claim 1, wherein the receiving terminal further comprises a triggering unit, when the triggering unit is activated, the coupling receiver executes the step of detecting receiving the coupling request.

5. A launching method of wireless pairing based on an emitting terminal of a wireless pairing system in claim 4, the method comprising the following steps:
transmitting matching requests successively to the receiving terminals in an identifier list of the receiving terminals, until an emitting terminal wireless transceiver receives a matching response;
transmitting coupling requests to detectable receiving terminals, on condition of no matching response from the receiving terminals received by the emitting terminal wireless transceiver within a first preset time;
detecting receiving the matching response or a coupling response, on condition of receiving the matching response or the coupling response, determining the receiving terminal getting the matching response or the coupling response as a target receiving terminal, and setting up a communication connection with the target receiving terminal.

6. The wireless pairing system of claim 1, wherein the pairing unit is further adapted to send the coupling requests in a second preset time to the detectable receiving terminals, and to cease sending the coupling requests to the detectable receiving terminals in condition of no coupling response received by the emitting terminal wireless transceiver.

7. The wireless pairing system of claim 6, wherein the traversal unit is further adapted to transmit the matching requests successively to the receiving terminals in the identifier list of the receiving terminals, when a third preset time is up after the pairing unit ceases sending coupling requests to the detectable receiving terminals, until the emitting terminal wireless transceiver gets the matching response.

8. A launching method of wireless pairing based on an emitting terminal of a wireless pairing system in claim 7, the method comprising the following steps:
transmitting matching requests successively to the receiving terminals in an identifier list of the receiving terminals, until an emitting terminal wireless transceiver receives a matching response;
transmitting coupling requests to detectable receiving terminals, on condition of no matching response from the receiving terminals received by the emitting terminal wireless transceiver within a first preset time;
detecting receiving the matching response or a coupling response, on condition of receiving the matching response or the coupling response, determining the receiving terminal getting the matching response or the coupling response as a target receiving terminal, and setting up a communication connection with the target receiving terminal.

9. A launching method of wireless pairing based on an emitting terminal of a wireless pairing system in claim 6, the method comprising the following steps:

transmitting matching requests successively to the receiving terminals in an identifier list of the receiving terminals, until an emitting terminal wireless transceiver receives a matching response;

transmitting coupling requests to detectable receiving terminals, on condition of no matching response from the receiving terminals received by the emitting terminal wireless transceiver within a first preset time;

detecting receiving the matching response or a coupling response, on condition of receiving the matching response or the coupling response, determining the receiving terminal getting the matching response or the coupling response as a target receiving terminal, and setting up a communication connection with the target receiving terminal.

10. The wireless pairing system of claim 1, wherein the emitting terminal is engaged with a first device, the receiving terminal is engaged with a second device comprising a power supply, on condition that an electrical connection is set between the second device and the first device, the second device is adapted to transmit power from the power supply to the emitting terminal by the electrical connection, thereby the emitting terminal is powered.

11. The wireless pairing system of claim 10, wherein the first device is a detachable locomotive, the second device is a detachable container connected with the detachable locomotive, the receiving terminal is a display device engaged with the detachable locomotive, the emitting terminal is a camera equipment disposed on the detachable container.

12. A launching method of wireless pairing based on an emitting terminal of a wireless pairing system in claim 11, the method comprising the following steps:

transmitting matching requests successively to the receiving terminals in an identifier list of the receiving terminals, until an emitting terminal wireless transceiver receives a matching response;

transmitting coupling requests to detectable receiving terminals, on condition of no matching response from the receiving terminals received by the emitting terminal wireless transceiver within a first preset time;

detecting receiving the matching response or a coupling response, on condition of receiving the matching response or the coupling response, determining the receiving terminal getting the matching response or the coupling response as a target receiving terminal, and setting up a communication connection with the target receiving terminal.

13. A launching method of wireless pairing based on an emitting terminal of a wireless pairing system in claim 10, the method comprising the following steps:

transmitting matching requests successively to the receiving terminals in an identifier list of the receiving terminals, until an emitting terminal wireless transceiver receives a matching response;

transmitting coupling requests to detectable receiving terminals, on condition of no matching response from the receiving terminals received by the emitting terminal wireless transceiver within a first preset time;

detecting receiving the matching response or a coupling response, on condition of receiving the matching response or the coupling response, determining the receiving terminal getting the matching response or the coupling response as a target receiving terminal, and setting up a communication connection with the target receiving terminal.

14. A launching method of wireless pairing based on an emitting terminal of a wireless pairing system in claim 1, the method comprising the following steps:

transmitting matching requests successively to the receiving terminals in an identifier list of the receiving terminals, until an emitting terminal wireless transceiver receives a matching response;

transmitting coupling requests to detectable receiving terminals, on condition of no matching response from the receiving terminals received by the emitting terminal wireless transceiver within a first preset time;

detecting receiving the matching response or a coupling response, on condition of receiving the matching response or the coupling response, determining the receiving terminal getting the matching response or the coupling response as a target receiving terminal, and setting up a communication connection with the target receiving terminal.

15. The launching method of wireless pairing of claim 14, wherein the step of transmitting the matching requests successively to the receiving terminals in the identifier list of the receiving terminals comprises:

sorting receiving terminal identifiers in the identifier list of the receiving terminals, according to a time tab corresponding to each receiving terminal identifier, wherein, the time tab is a history pairing time between the receiving terminal and the emitting terminal in accordance with relating the receiving terminal identifier, and the receiving terminal identifiers are sorted based on a time interval between a history pairing time and a current time in an order from small to large.

16. The launching method of wireless pairing of claim 14, wherein the step of transmitting coupling requests to the detectable receiving terminals comprises:

ceasing pairing process, within a second preset time for transmitting the coupling requests successively to the detectable receiving terminals, without receiving the coupling response; or suspending pairing process, and after a third preset time, transmitting the coupling requests successively to the receiving terminals in the identifier list of the receiving terminals, until the coupling response is received.

* * * * *